United States Patent
Tanaka et al.

(10) Patent No.: US 9,039,859 B2
(45) Date of Patent: May 26, 2015

(54) METHOD FOR MANUFACTURING MONOLITHIC CERAMIC ELECTRONIC COMPONENTS

(71) Applicant: Murata Manufacturing Co., Ltd., Nagaokakyo-shi, Kyoto-fu (JP)

(72) Inventors: Junya Tanaka, Nagaokakyo (JP); Hironori Tsutsumi, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 63 days.

(21) Appl. No.: 13/759,177

(22) Filed: Feb. 5, 2013

(65) Prior Publication Data

US 2013/0199717 A1 Aug. 8, 2013

(30) Foreign Application Priority Data

Feb. 7, 2012 (JP) ................. 2012-024322

(51) Int. Cl.
*B29C 65/00* (2006.01)
*C03B 29/00* (2006.01)
(Continued)

(52) U.S. Cl.
CPC ....... *B32B 38/0004* (2013.01); *Y10T 156/1075* (2015.01); *C04B 2237/32* (2013.01); *C04B 2237/40* (2013.01); *B26D 1/147* (2013.01); *B26D 1/15* (2013.01); *Y10T 156/1052* (2015.01); *Y10T 156/1348* (2015.01); *B32B 2315/02* (2013.01); *H01G 4/30* (2013.01);
(Continued)

(58) Field of Classification Search
CPC ............ B32B 38/0004; B32B 2315/02; B32B 38/00; H01G 4/12; H01G 4/30; H01G 7/00; H01G 13/00; H01G 4/255; H01G 4/0085; H01G 4/232; B28B 11/14; B28D 1/22; B28D 5/00; B26D 1/04; B26D 1/147; B26D 1/15; Y10T 156/1052; B10T 156/1348; C04B 2237/32; C04B 2237/40
USPC ...................................... 156/89.12, 264, 250
See application file for complete search history.

(56) References Cited

U.S. PATENT DOCUMENTS

2009/0291317 A1* 11/2009 Kawasaki et al. ............. 428/546
2010/0002356 A1* 1/2010 Yoshida et al. ............ 361/301.4
(Continued)

FOREIGN PATENT DOCUMENTS

| JP | 61-248413 A | | 11/1986 |
| JP | 1-225307 A | | 9/1989 |
| JP | 03173108 A | * | 7/1991 |
| JP | 10-241908 A | | 9/1998 |
| JP | 2005-101038 A | | 4/2005 |
| JP | 2006-040910 A | | 2/2006 |

(Continued)

OTHER PUBLICATIONS

Domon et al., "JP 2010-238989, machine translation", Published Oct. 21, 2010.*

*Primary Examiner* — Alex Feta
(74) *Attorney, Agent, or Firm* — Keating & Bennett, LLP

(57) ABSTRACT

A ceramic green sheet laminate is produced by stacking ceramic green sheets, each including conductive films for forming first or second internal electrodes on a surface thereof. A first cutting step is performed in which the ceramic green sheet laminate is cut to form first and second end surfaces at which the first or second internal electrodes are exposed. A second cutting step is performed in which the ceramic green sheet laminate is cut to form first and second side surfaces at which the first and second internal electrodes are exposed. In the second cutting step, the ceramic green sheet laminate is pressed and cut by moving a cutting blade in a length direction or a width direction.

19 Claims, 23 Drawing Sheets

(51) Int. Cl.
  *B32B 38/00* (2006.01)
  *H01G 4/30* (2006.01)
  *H01G 4/12* (2006.01)
  *B26D 1/147* (2006.01)
  *B26D 1/15* (2006.01)
  *H01G 4/008* (2006.01)
  *H01G 4/232* (2006.01)

(52) U.S. Cl.
  CPC .............. *H01G 4/0085* (2013.01); *H01G 4/12* (2013.01); *H01G 4/232* (2013.01)

(56) References Cited

U.S. PATENT DOCUMENTS

2010/0119816 A1* 5/2010 Shimokawa et al. ......... 428/324
2011/0024033 A1* 2/2011 Asano et al. .................. 156/264
2012/0250220 A1* 10/2012 Yamashita et al. ......... 361/321.2

FOREIGN PATENT DOCUMENTS

JP         2010238989 A   * 10/2010
WO    WO 2011071143 A1   *  6/2011

* cited by examiner

METHOD FOR MANUFACTURING MONOLITHIC CERAMIC ELECTRONIC COMPONENTS

BACKGROUND OF THE INVENTION

1. Field of the Invention

The present invention relates to a method for manufacturing monolithic ceramic electronic components.

2. Description of the Related Art

In recent years, as electronic devices (e.g., cellular phones and portable music players) have become smaller, monolithic ceramic electronic components (e.g., monolithic ceramic capacitors) included in such electronic devices have become smaller rapidly.

For example, Japanese Unexamined Patent Application Publication No. 61-248413 describes a method for manufacturing monolithic ceramic capacitors. In this method, a mother ceramic laminate having conductive films for forming internal electrodes therein is pressed and cut into strips by moving at least one cutting blade in a thickness direction, the cutting blade being positioned along a first direction perpendicular to the thickness direction. Then, the resulting strips are further pressed and cut by moving at least one cutting blade in the thickness direction, the cutting blade being positioned along a second direction perpendicular to both the thickness direction and the first direction. Thus, main bodies of electronic components substantially in the shape of a rectangular parallelepiped are obtained.

In recent years, in an effort to improve the performance of monolithic ceramic electronic components, the thickness of ceramic layers between first and second internal electrodes has been reduced. However, when the method described in Japanese Unexamined Patent Application Publication No. 61-248413 is used to manufacture monolithic ceramic electronic components having thin ceramic layers, a short circuit tends to occur between the first and second internal electrodes.

SUMMARY OF THE INVENTION

Preferred embodiments of the present invention provide a method of manufacturing a ceramic electronic component in which even monolithic ceramic electronic components with thin ceramic layers can be desirably manufactured and a short circuit is less likely to occur between first and second internal electrodes.

According to a preferred embodiment of the present invention, a method for manufacturing monolithic ceramic electronic components includes a preparing step of preparing ceramic laminates. Each of the ceramic laminates includes a ceramic laminate main body substantially in the shape of a rectangular parallelepiped, the ceramic laminate main body including first and second principal surfaces extending in a length direction and a width direction, first and second side surfaces extending in the length direction and a thickness direction, and first and second end surfaces extending in the width direction and the thickness direction; first internal electrodes disposed inside the ceramic laminate main body to be parallel or substantially parallel with the first and second principal surfaces, the first internal electrodes being exposed at the first end surface and the first and second side surfaces; and second internal electrodes disposed inside the ceramic laminate main body to face the respective first internal electrodes in the thickness direction, with ceramic layers interposed between adjacent ones of the first and second internal electrodes, the second internal electrodes being exposed at the second end surface and the first and second side surfaces. The preparing step includes a step of producing a ceramic green sheet laminate by stacking ceramic green sheets, each including conductive films for forming the first or second internal electrodes on a surface thereof; a first cutting step of cutting the ceramic green sheet laminate to form the first and second end surfaces at which the first or second internal electrodes are exposed; and a second cutting step of cutting the ceramic green sheet laminate to form the first and second side surfaces at which the first and second internal electrodes are exposed. In the second cutting step, the ceramic green sheet laminate is pressed and cut by moving a cutting blade in the length direction or the width direction.

In the method for manufacturing monolithic ceramic electronic components according to a preferred embodiment of the present invention, the ceramic green sheets may be each about 1.5 μm or less in thickness, for example.

In the method for manufacturing monolithic ceramic electronic components according to a preferred embodiment of the present invention, the second cutting step may be performed after the ceramic green sheet laminate is cut into strips and caused to adhere to a base in the first cutting step.

In the method for manufacturing monolithic ceramic electronic components according to a preferred embodiment of the present invention, the preparing step may further include, before the first and second cutting steps, a step of cutting off an outer edge of the ceramic green sheet laminate to allow the conductive films to be exposed.

Preferred embodiments of the present invention provide a method of manufacture in which even monolithic ceramic electronic components with thin ceramic layers can be desirably manufactured and a short circuit is less likely to occur between first and second internal electrodes.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
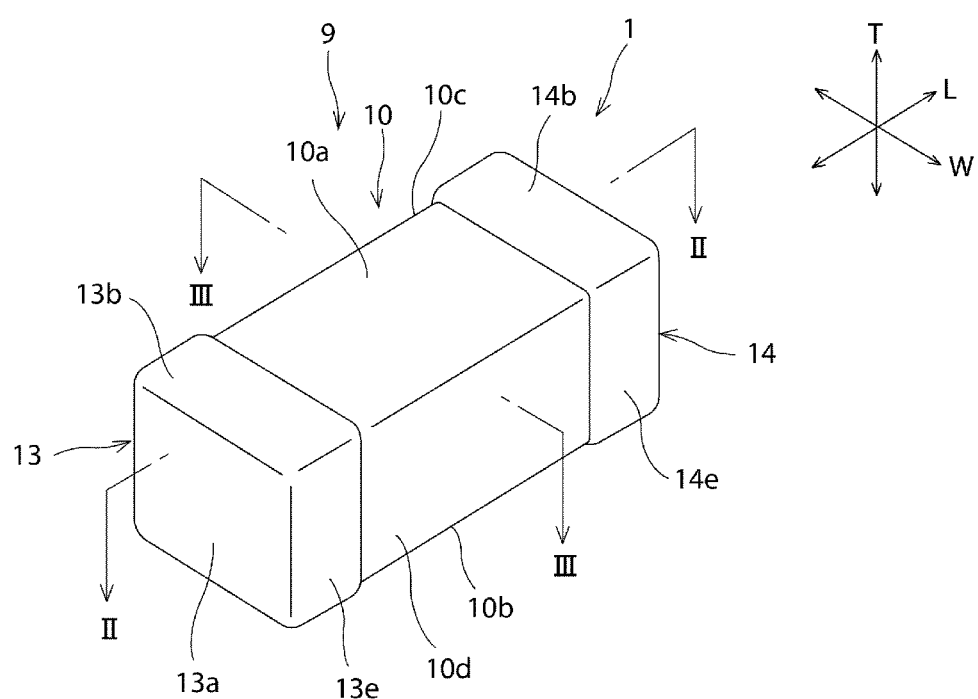
FIG. 1 is a schematic perspective view of a monolithic ceramic electronic component according to a first preferred embodiment of the present invention.

Preferred embodiments of the present invention will now be described. Note that the following preferred embodiments are merely examples and the present invention is by no means limited to the following preferred embodiments.

In the drawings to be referred to in the following description of the preferred embodiments, components having substantially the same functions will be identified by the same reference numerals. The drawings to be referred to in the following description of the preferred embodiments are schematic illustrations which may not necessarily be drawn to scale. This means that dimensional ratios of elements illustrated in the drawings may be different from those of the actual elements. Additionally, dimensional ratios of elements may be different among the drawings. Specific dimensional ratios of objects are to be determined by taking into account the following description.

First Preferred Embodiment

Figure 2:
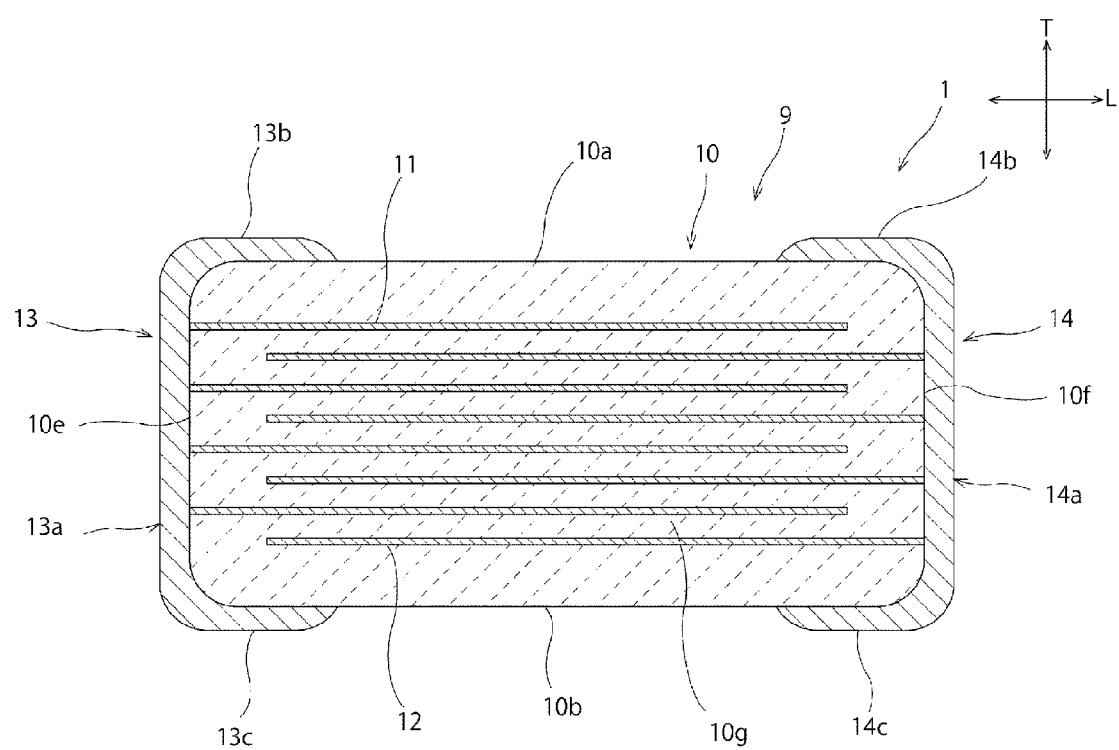
FIG. 2 is a schematic cross-sectional view taken along line II-II of FIG. 1.
Figure 3:
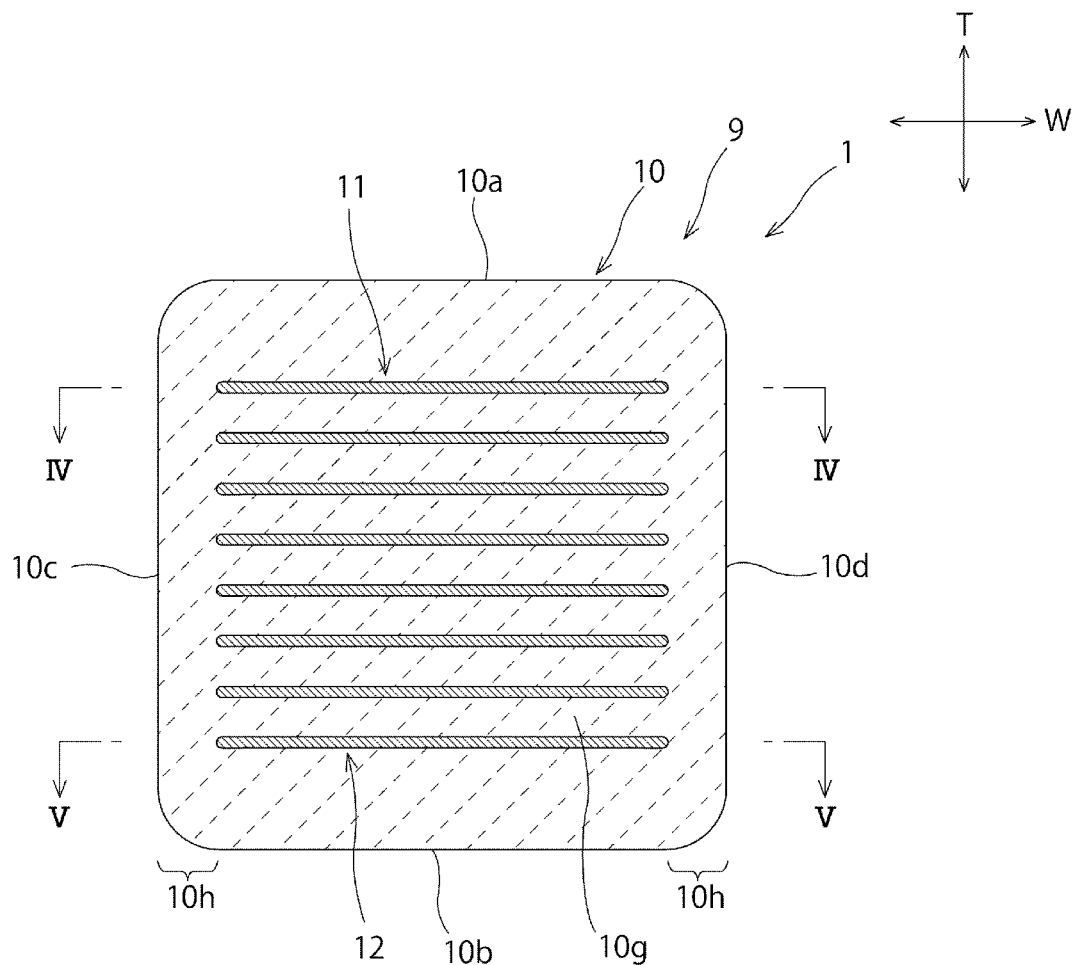
FIG. 3 is a schematic cross-sectional view taken along line III-III of FIG. 1.
Figure 4:
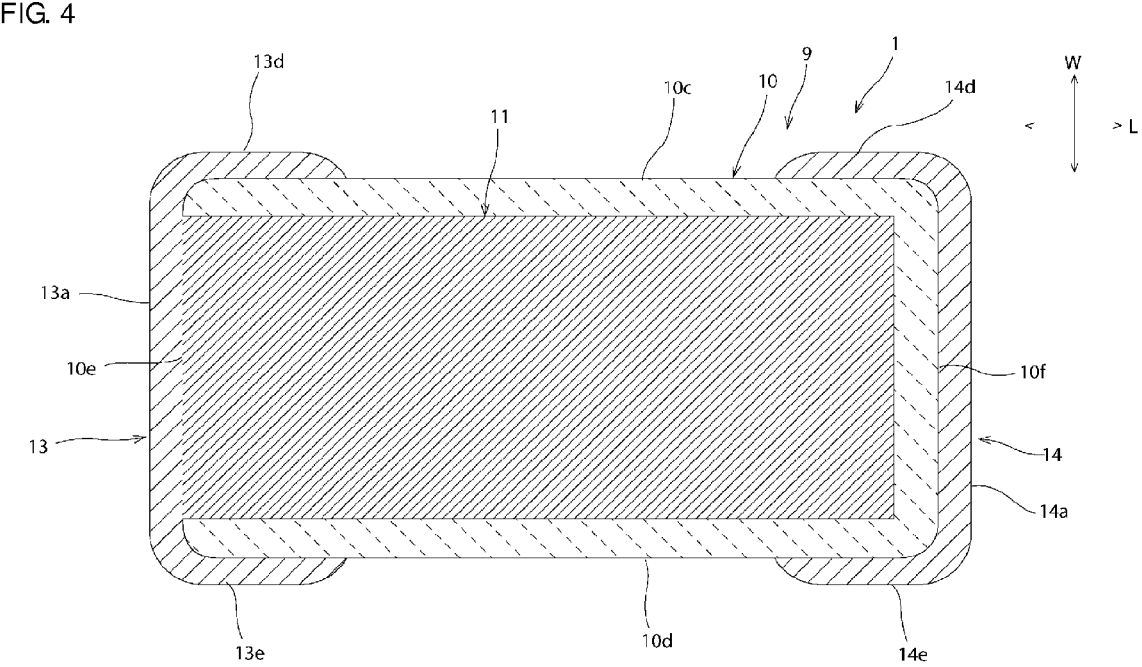
FIG. 4 is a schematic cross-sectional view taken along line IV-IV of FIG. 3.
Figure 5:
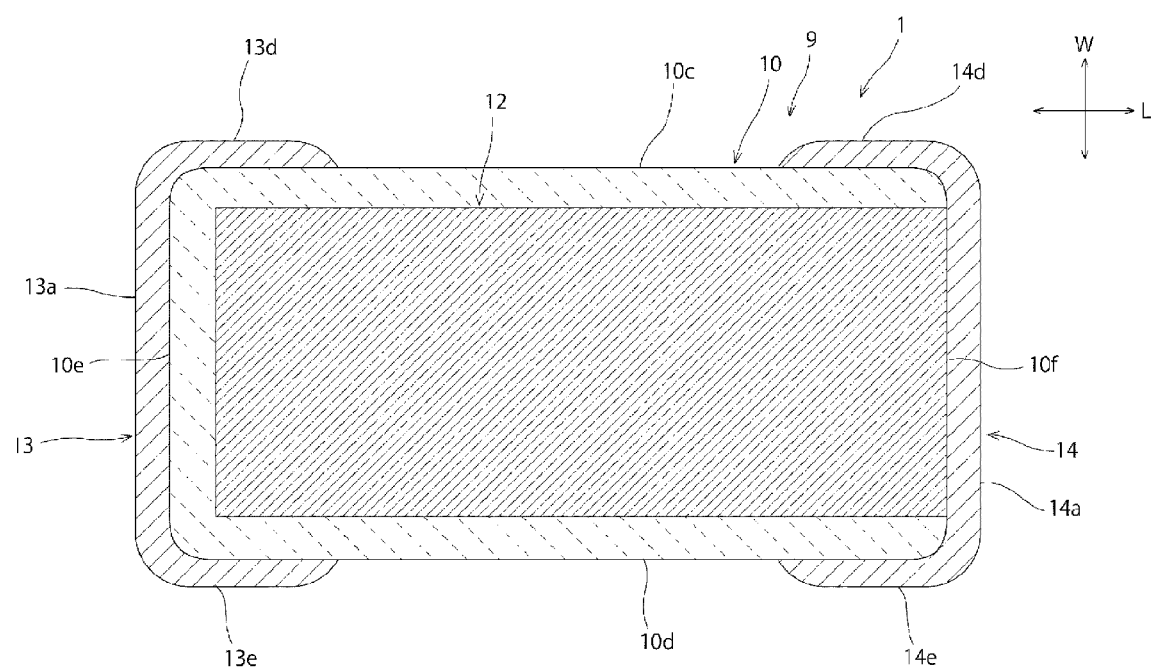
FIG. 5 is a schematic cross-sectional view taken along line V-V of FIG. 3.

FIG. 1 is a schematic perspective view of a monolithic ceramic electronic component according to a first preferred embodiment of the present invention. FIG. 2 is a schematic cross-sectional view taken along line II-II of FIG. 1. FIG. 3 is a schematic cross-sectional view taken along line III-III of FIG. 1. FIG. 4 is a schematic cross-sectional view taken along line IV-IV of FIG. 3. FIG. 5 is a schematic cross-sectional view taken along line V-V of FIG. 3.

A configuration of a monolithic ceramic electronic component 1 to be manufactured in the present preferred embodiment will now be described with reference to FIG. 1 to FIG. 5.

As illustrated in FIG. 1 to FIG. 3, the monolithic ceramic electronic component 1 includes a ceramic base 10 substantially in the shape of a rectangular parallelepiped. The ceramic base 10 includes first and second principal surfaces 10a and 10b extending in a length direction L and a width direction W. As illustrated in FIG. 1 and FIG. 3, the ceramic base 10 includes first and second side surfaces 10c and 10d extending in a thickness direction T and the length direction L. As illustrated in FIG. 2, the ceramic base 10 includes first and second end surfaces 10e and 10f extending in the thickness direction T and a width direction W.

In the present invention, the term "rectangular parallelepiped" includes rectangular parallelepipeds with rounded corners and edges. That is, a component in the shape of a "rectangular parallelepiped" broadly refers to any component including first and second principal surfaces, first and second side surfaces, and first and second end surfaces. Some or all of the principal surfaces, side surfaces, and end surfaces may be provided with indentations.

Dimensions of the ceramic base 10 are not particularly limited, but a height, a length, and a width of the ceramic base 10 may be, for example, in the range of about 0.1 mm to about 10 mm.

The ceramic base 10 is made of an appropriate ceramic material. The type of ceramic that forms the ceramic base 10 can be selected appropriately depending on the characteristics of the monolithic ceramic electronic component 1 desired.

For example, if the monolithic ceramic electronic component 1 is a capacitor, the ceramic base 10 can be made of dielectric ceramic. Non-limiting examples of the dielectric ceramic include barium titanate ($BaTiO_3$), calcium titanate ($CaTiO_3$), strontium titanate ($SrTiO_3$), and calcium zirconium oxide ($CaZrO_3$).

For example, if the monolithic ceramic electronic component 1 is a piezoelectric component, the ceramic base 10 can be made of piezoelectric ceramic, such as lead zirconate titanate (PZT)-based ceramic.

For example, if the monolithic ceramic electronic component 1 is a thermistor, the ceramic base 10 can be made of semiconductor ceramic, such as spinel-based ceramic.

For example, if the monolithic ceramic electronic component 1 is an inductor, the ceramic base 10 can be made of magnetic ceramic, such as ferrite ceramic.

As illustrated in FIG. 2 and FIG. 3, the ceramic base includes a plurality of substantially rectangular first and second internal electrodes 11 and 12 alternately arranged at regular intervals in the thickness direction T. Both the first and second internal electrodes 11 and 12 are parallel or substantially parallel to the first and second principal surfaces 10a and 10b. The first and second internal electrodes 11 and 12 face each other in the thickness direction T, with ceramic layers 10g interposed between adjacent ones of the first and second internal electrodes 11 and 12.

The ceramic layers 10g are each preferably about 1.5 μm or less in thickness, for example. By reducing the thickness of the ceramic layers 10g, the performance of the monolithic ceramic electronic component 1 can be improved.

The first internal electrodes 11 are exposed at the first end surface 10e, but are not exposed at the first and second principal surfaces 10a and 10b, the first and second side surfaces 10c and 10d, and the second end surface 10f. On the other hand, the second internal electrodes 12 are exposed at the second end surface 10f, but are not exposed at the first and second principal surfaces 10a and 10b, the first and second side surfaces 10c and 10d, and the first end surface 10e. This means that the first and second internal electrodes 11 and 12 face each other in the center of the ceramic base 10 in both the length direction L and the width direction W. A region where the first and second internal electrodes 11 and 12 face each other in the thickness direction T forms an effective area that performs the functions of the monolithic ceramic electronic component 1.

As illustrated in FIG. 3, the ceramic base 10 includes protective portions 10h on both sides in the width direction W. The protective portions 10h are areas where the first and second internal electrodes 11 and 12 are not present. The protective portions 10h do not contribute to the functions of the monolithic ceramic electronic component 1. From the point of view of the performance of the monolithic ceramic electronic component 1, the protective portions 10h are preferably as thin as possible. For example, if the monolithic ceramic electronic component 1 is a ceramic capacitor, the thinner the protective portions 10h, the larger the electrostatic capacity can be. However, the monolithic ceramic electronic component 1 having too thin protective portions 10h, or no protective portions 10h at all, is not preferable in that atmospheric moisture may enter the spaces between the first and second internal electrodes 11 and 12 and the resistance of the monolithic ceramic electronic component 1 to humidity may be lowered.

For example, the protective portions 10h are each preferably in the range of about 0.02 mm to about 0.5 mm in size in the width direction W, for example.

The first and second internal electrodes 11 and 12 can be made of an appropriate conductive material. For example, the first and second internal electrodes 11 and 12 can be made of a metal selected from a group of nickel (Ni), copper (Cu), silver (Ag), palladium (Pd), and gold (Au), or made of an alloy containing at least one metal selected from the group of Ni, Cu, Ag, Pd, and Au (e.g., Ag—Pd alloy).

As illustrated in FIG. 1 and FIG. 2, the monolithic ceramic electronic component 1 includes first and second external electrodes 13 and 14. The first external electrode 13 is connected to the first internal electrodes 11 as illustrated in FIG. 2 and FIG. 4, whereas the second external electrode 14 is connected to the second internal electrodes 12 as illustrated in FIG. 2 and FIG. 5.

As illustrated in FIG. 1, FIG. 2, FIG. 4, and FIG. 5, the first and second external electrodes 13 and 14 extend from the first and second end surfaces 10e and 10f, respectively, to reach the first and second principal surfaces 10a and 10b and the first and second side surfaces 10c and 10d. In other words, portions of the respective first and second external electrodes 13 and 14 are located on the first and second principal surfaces 10a and 10b and the first and second side surfaces 10c and 10d.

Specifically, the first external electrode 13 includes a first portion 13a formed on the first end surface 10e, a second portion 13b formed on the first principal surface 10a, a third portion 13c formed on the second principal surface 10b, a fourth portion 13d formed on the first side surface 10c, and a fifth portion 13e formed on the second side surface 10d. The second external electrode 14 includes a first portion 14a formed on the second end surface 10f, a second portion 14b formed on the first principal surface 10a, a third portion 14c formed on the second principal surface 10b, a fourth portion 14d formed on the first side surface 10c, and a fifth portion 14e formed on the second side surface 10d.

The fourth portion 13d and the fifth portion 13e of the first external electrode 13 are electrically insulated from each other by the second internal electrodes 12 and the protective portions 10h. The fourth portion 14d and the fifth portion 14e of the second external electrode 14 are electrically insulated from each other by the first internal electrodes 11 and the protective portions 10h.

The first and second external electrodes 13 and 14 can be made of an appropriate conductive material. The first and second external electrodes 13 and 14 may be formed by layers of conductive films.

Specifically, in the present preferred embodiment, the first and second external electrodes 13 and 14 each include a foundation layer including one or more conductive films, and one or more plating layers formed on the foundation layer. The foundation layer of the first external electrode 13 is formed on the first end surface 10e, and the foundation layer of the second external electrode 14 is formed on the second end surface 10f.

For example, each foundation layer can be formed by a sintered metal layer, a plating layer, or a conductive resin layer made of conductive resin obtained by adding a conductive filler to thermosetting resin or to photo-curable resin. The sintered metal layer may be formed by firing simultaneously with the first and second internal electrodes 11 and 12 (co-firing), or may be formed by applying a conductive paste to the ceramic base 10 and baking it (post-firing).

A conductive material contained in the foundation layer is not particularly limited. Non-limiting examples of the conductive material contained in the foundation layer include a metal, such as Cu, Ni, Ag, Pd, or Au, and an alloy containing at least one of these metals (e.g., Ag—Pd alloy).

For example, the maximum thickness of the foundation layer can be in the range of about 20 µm to about 100 µm.

Each plating layer can be made of a metal, such as Cu, Ni, tin (Sn), Ag, Pd, or Au, or can be made of an alloy containing at least one of these metals (e.g., Ag—Pd alloy).

For example, the maximum thickness of each plating layer can be in the range of about 1 µm to about 10 µm.

There may be a resin layer that provides stress relaxation provide between a foundation layer and a plating layer.

Figure 6:
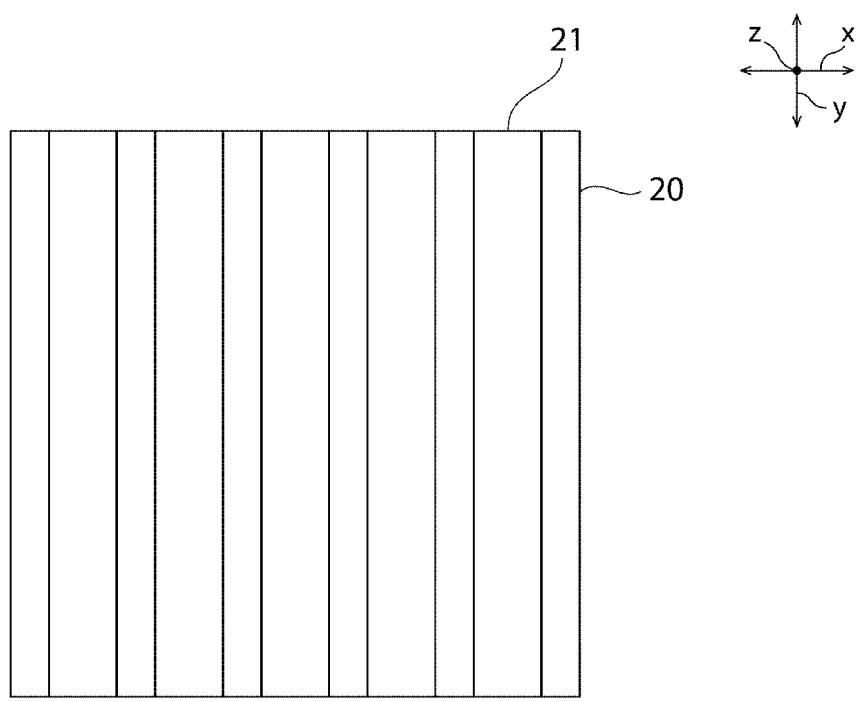
FIG. 6 is a schematic plan view of a ceramic green sheet on which a conductive paste is printed.
Figure 7:
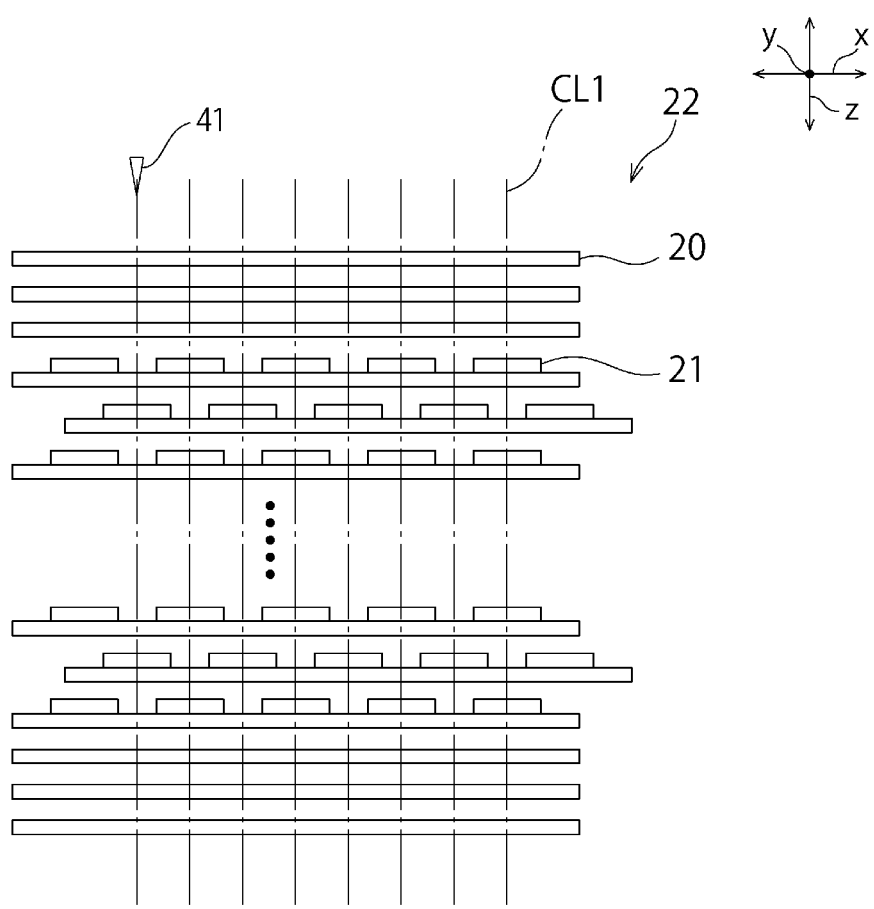
FIG. 7 is a schematic exploded side view of a ceramic green sheet laminate.
Figure 8:
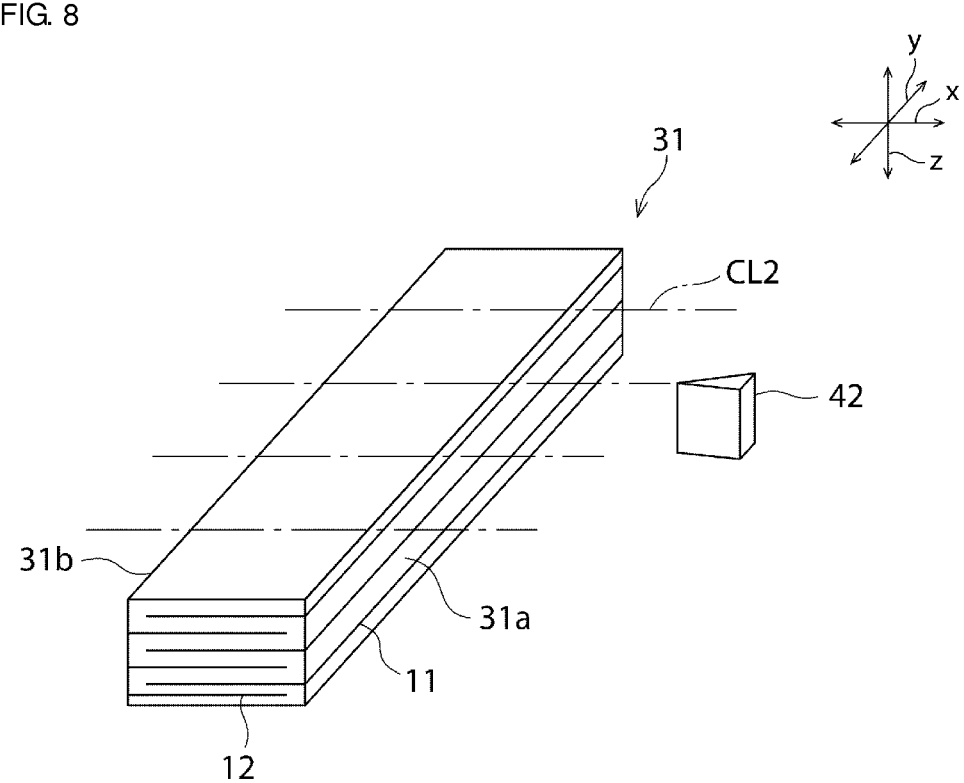
FIG. 8 is a schematic perspective view for explaining a second cutting step.
Figure 9:
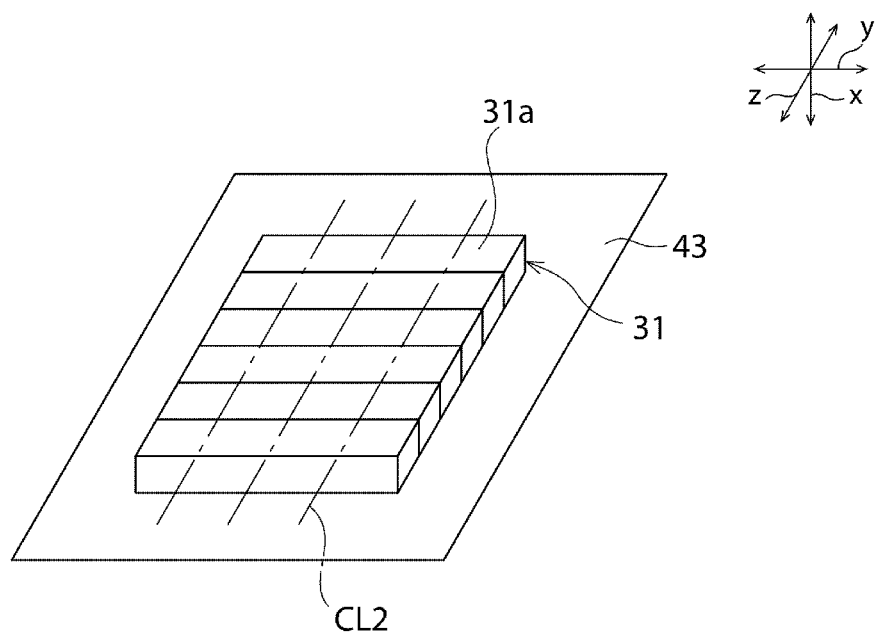
FIG. 9 is another schematic perspective view for explaining the second cutting step.
Figure 10:
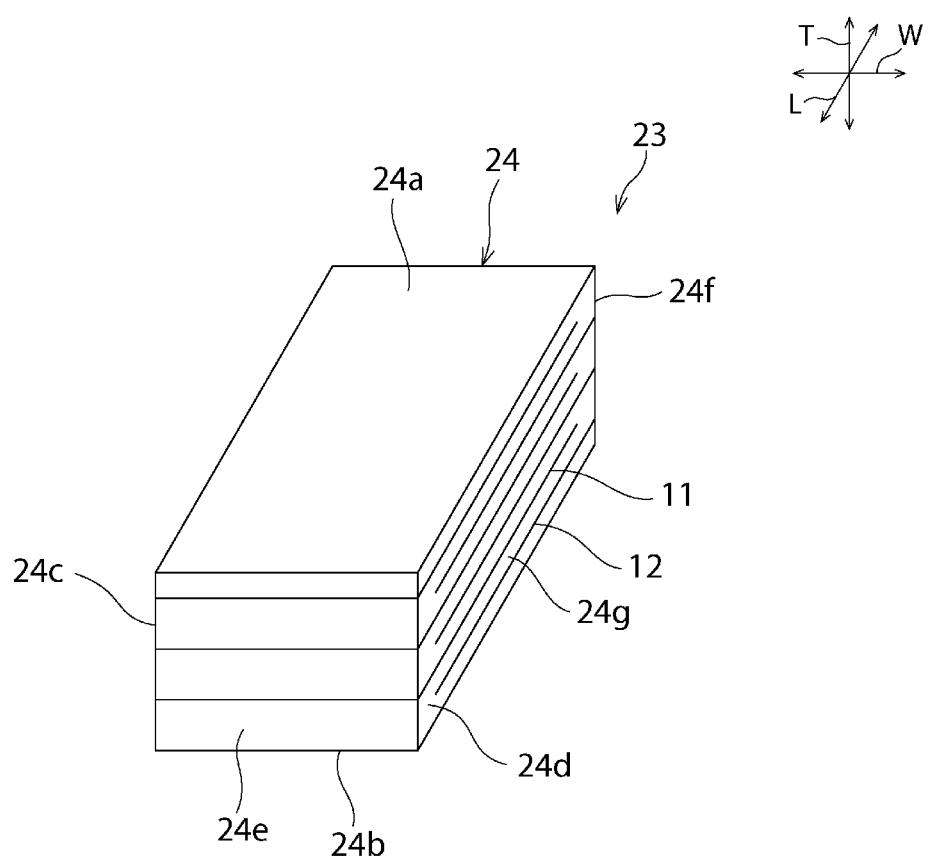
FIG. 10 is a schematic perspective view of a raw ceramic laminate.
Figure 11:
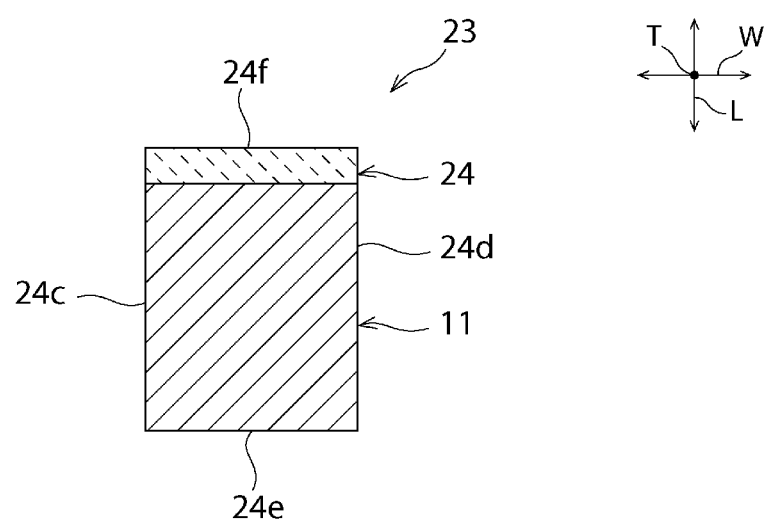
FIG. 11 is a schematic cross-sectional view of the raw ceramic laminate.
Figure 12:
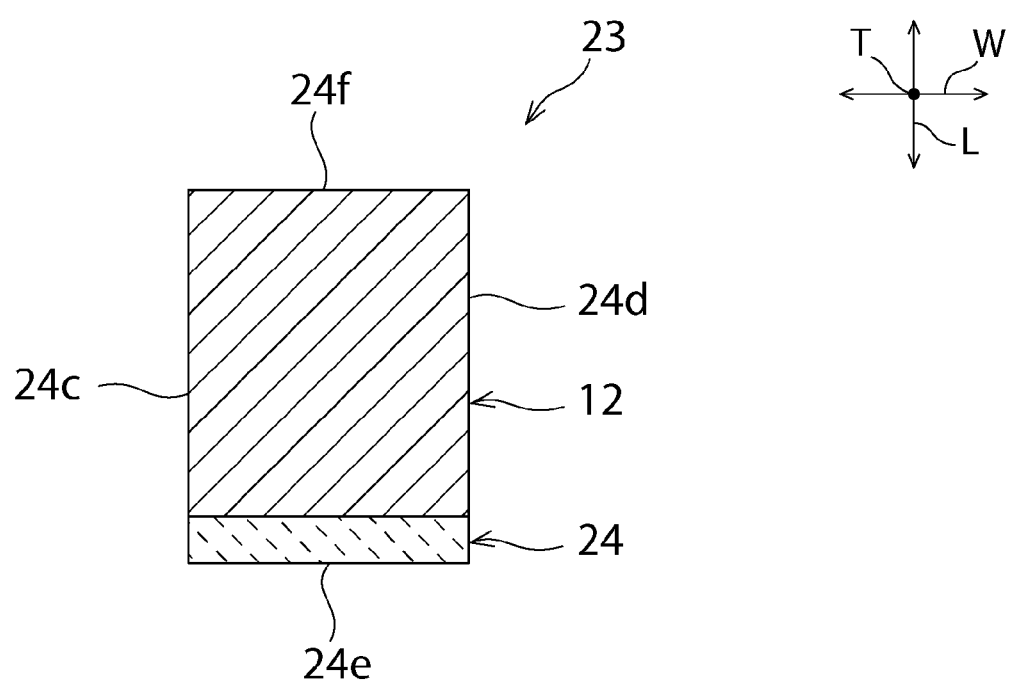
FIG. 12 is another schematic cross-sectional view of the raw ceramic laminate.
Figure 13:
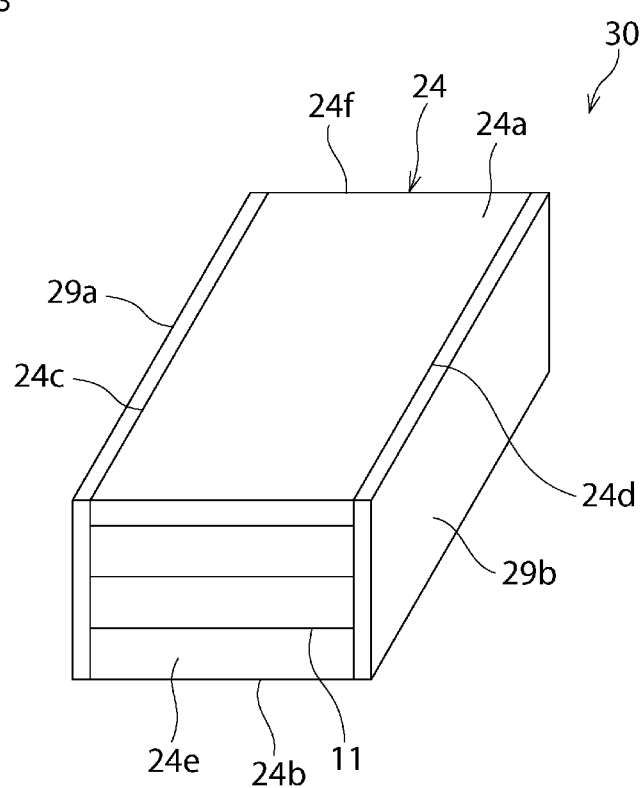
FIG. 13 is a schematic perspective view of a raw ceramic base.
Figure 14:
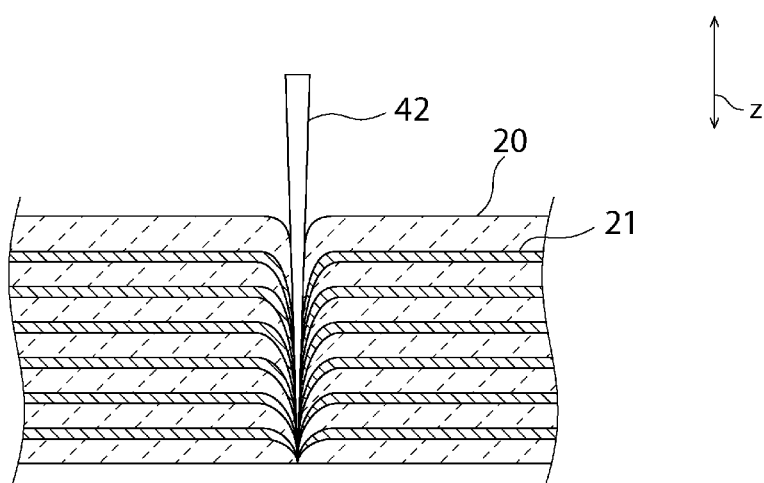
FIG. 14 is a schematic cross-sectional view for explaining the case where the ceramic green sheet laminate is cut in a stacking direction of conductive films in the second cutting step.

FIG. 6 is a schematic plan view of a ceramic green sheet on which a conductive paste is printed. FIG. 7 is a schematic exploded side view of a ceramic green sheet laminate. FIG. 8 is a schematic perspective view for explaining a second cutting step. FIG. 9 is another schematic perspective view for explaining the second cutting step. FIG. 10 is a schematic perspective view of a raw ceramic laminate. FIG. 11 is a schematic cross-sectional view of the raw ceramic laminate. FIG. 12 is another schematic cross-sectional view of the raw ceramic laminate. FIG. 13 is a schematic perspective view of a raw ceramic base. FIG. 14 is a schematic cross-sectional view for explaining the case where the ceramic green sheet laminate is cut in a stacking direction of conductive films in the second cutting step.

A method for manufacturing the monolithic ceramic electronic component 1 according to the present preferred embodiment will now be described with reference mainly to FIG. 6 to FIG. 14.

First, a plurality of ceramic green sheets 20 (see FIG. 6) for forming the ceramic base 10 are produced. Each ceramic green sheet 20 can be produced, for example, in the following manner. First, a ceramic paste is prepared which contains a ceramic powder, a dispersion medium, and as necessary a binder. The ceramic paste is printed on a film, such as a resin film, in a sheet-like form and dried to produce a ceramic green sheet 20. The ceramic paste can be printed, for example, by a die coater method, a gravure coater method, or a microgravure coater method.

In the present preferred embodiment, each ceramic green sheet 20 preferably is about 1.5 µm or less in thickness, for example. This makes it possible to obtain a thin ceramic layer 10g and thus to manufacture high-capacitance monolithic ceramic capacitors.

Next, a plurality of conductive films 21 for forming the first and second internal electrodes 11 and 12 are formed on the ceramic green sheets 20. Specifically, the conductive films are printed in stripes such that they are spaced from each other in the x direction. The conductive films 21 can be printed, for example, by screen printing, inkjet printing, or gravure printing. For example, the conductive films 21 can be about 1.5 μm or less in thickness.

As illustrated in FIG. 7, after a plurality of ceramic green sheets 20 having no conductive films 21 printed thereon are stacked in layers, a plurality of ceramic green sheets 20 having conductive films 21 printed thereon are stacked to be alternately displaced in the x direction, which is perpendicular or substantially perpendicular to the y direction in which the conductive films 21 extend. Additionally, a plurality of ceramic green sheets 20 having no conductive films 21 printed thereon are stacked on top of the ceramic green sheets 20 having the conductive films 21 printed thereon. A ceramic green sheet laminate 22 is thus obtained. As necessary, the ceramic green sheet laminate 22 may be hydrostatically pressed in the z direction (thickness direction).

By dividing the ceramic green sheet laminate 22 into a plurality of pieces, raw ceramic laminates 23 each illustrated in FIG. 10 to FIG. 12 are produced. A preparing step of preparing the raw ceramic laminates 23 is performed in the manner described above.

Each raw ceramic laminate 23 includes a ceramic laminate main body 24 substantially in the shape of a rectangular parallelepiped. The ceramic laminate main body 24 includes first and second principal surfaces 24a and 24b, first and second side surfaces 24c and 24d, and first and second end surfaces 24e and 24f. The first and second principal surfaces 24a and 24b extend in the length direction L and the width direction W. The first and second side surfaces 24c and 24d extend in the length direction L and the thickness direction T. The first and second end surfaces 24e and 24f extend in the width direction W and the thickness direction T.

The ceramic laminate main body 24 includes the first and second internal electrodes 11 and 12 formed by the conductive films 21. The first internal electrodes 11 are parallel or substantially parallel to the first and second principal surfaces 24a and 24b. The first internal electrodes 11 are exposed at the first end surface 24e and the first and second side surfaces 24c and 24d. The first internal electrodes 11 are not exposed at the second end surface 24f.

The second internal electrodes 12 are parallel or substantially parallel to the first and second principal surfaces 24a and 24b. The second internal electrodes 12 are exposed at the second end surface 24f and the first and second side surfaces 24c and 24d. The second internal electrodes 12 are not exposed at the first end surface 24e. The first and second internal electrodes 11 and 12 face each other in the thickness direction T, with ceramic layers 24g interposed between adjacent ones of the first and second internal electrodes 11 and 12.

Next, as illustrated in FIG. 13, first and second protective portions 29a and 29b are added to the raw ceramic laminate 23. Specifically, first, a ceramic paste is prepared which contains a ceramic powder, a dispersion medium, and as a binder. The ceramic paste may be of the same type as that used to produce the ceramic green sheets 20. Next, the ceramic paste is applied onto the first and second side surfaces 24c and 24d of the raw ceramic laminate 23 to cover the first and second internal electrodes 11 and 12 and dried. The first and second protective portions 29a and 29b are thus made, and a raw ceramic base 30 including the first and second protective portions 29a and 29b and the raw ceramic laminate 23 is obtained. To create such protective portions, the raw ceramic laminate 23 may be pressed against a ceramic green sheet to cut out the protective portions.

By firing the raw ceramic base 30 obtained in the manner described above, an electronic component main body 9 (see FIG. 1) can be obtained. The electronic component main body 9 includes the ceramic base 10 obtained by firing the raw ceramic base 30, and the first and second internal electrodes 11 and 12. The protective portions 10h described above are formed by ceramic layers obtained by firing the first and second protective portions 29a and 29b.

Then, the monolithic ceramic electronic component 1 can be obtained by forming the first and second external electrodes 13 and 14. The first and second external electrodes 13 and 14 may be formed by applying a conductive paste to the ceramic base 10 and baking it, or may be formed by plating.

A step of dividing the ceramic green sheet laminate 22 according to the present preferred embodiment will now be described in detail with reference to FIG. 7 to FIG. 9.

By cutting off an outer edge of the ceramic green sheet laminate 22, the conductive films 21 or cutting position marks are exposed at four end surfaces of the ceramic green sheet laminate 22. In the ceramic green sheet laminate 22 from which the outer edge has been cut off, the shape of the conductive films 21 or cutting position marks exposed at the end surfaces on both sides in the x direction are different from the shape of the conductive films 21 or cutting position marks exposed at the end surfaces on both sides in the y direction. Therefore, by cutting off the outer edge of the ceramic green sheet laminate 22 in advance as in the present preferred embodiment, it is possible to easily identify the direction in which the conductive films 21 inside the ceramic green sheet laminate 22 extend.

Next, a first cutting step is performed. Specifically, the ceramic green sheet laminate 22 is pressed and cut by moving a cutting blade 41 in the z direction, or only the z direction, the cutting blade 41 being positioned along a first cutting line CL1 extending in the y direction. Thus, the first and second end surfaces 24e and 24f illustrated in FIG. 10 are obtained. That is, a plurality of strips 31 each including first and second side surfaces 31a and 31b (see FIG. 8) corresponding to the first and second end surfaces 24e and 24f, respectively, are obtained.

Next, a second cutting step is performed. Specifically, by cutting the strips 31 along second cutting lines CL2 illustrated in FIG. 8, the first and second side surfaces 24c and 24d are formed and the raw ceramic laminate 23 illustrated in FIG. 10 is obtained.

In the second cutting step, a cutting blade 42 (see FIG. 8) positioned along the z direction (stacking direction of the conductive films 21) is moved in the x direction, or only the x direction, perpendicular or substantially perpendicular to the z direction. Thus, the strips are pressed and cut along both the z direction and the x direction.

Specifically, as illustrated in FIG. 9, the strips 31 are held in parallel or substantially in parallel with each other on an elastic base 43, with the first side surfaces 31a facing upward. Then, the strips 31 are pressed and cut by moving the cutting blade 42 (see FIG. 8) in the x direction, the cutting blade 42 being positioned along the z direction. By repeating this pressing and cutting operation, a plurality of raw ceramic laminates 23 are produced from the strips 31. Alternatively, the plurality of the strips 31 may be simultaneously pressed and cut. This can further improve the efficiency of cutting. In the present preferred embodiment, the strips 31 are held on the base 43 defined by an elastic body. Therefore, for example, even if protrusions are formed in the upper surface of the strips 31 by the presence of the conductive films 21, the strips 31 can be properly secured to the base 43. It is thus possible to desirably perform the second cutting step.

From the point of view of manufacturability, it is preferable, as illustrated in FIG. 14, that the ceramic green sheet laminate 22 be pressed and cut by moving the cutting blade 42 in the z direction in the second cutting step, as is the case with the first cutting step. This is because the manufacturing process can be simplified, as there is no need to perform the step of turning and securing the strips 31 between the first and second cutting steps.

However, when the ceramic layers 10g each are as thin as about 1.5 µm, for example, as in the present preferred embodiment, the cut end portions of the ceramic green sheets 20 and the conductive films 21 are displaced in the z direction, as the cutting blade 42 moves in the z direction. This may cause a short circuit between the resulting first and second internal electrodes.

On the other hand, in the second cutting step of the present preferred embodiment, as illustrated in FIG. 8, the strips 31 are cut by moving the cutting blade 42 in the x direction perpendicular or substantially perpendicular to the z direction (stacking direction), the cutting blade 42 being positioned along the z direction. Therefore, the conductive films 21 do not easily deform as the cutting blade 42 moves, and a short circuit between the first and second internal electrodes 11 and 12 is less likely to occur. Thus, even though the ceramic layers 10g are thin, monolithic ceramic electronic components 1 can be desirably manufactured at a high yield rate. In particular, if the monolithic ceramic electronic components 1 having the thin ceramic layers 10g are capacitors, high-capacitance capacitors can be manufactured at a high yield rate.

Other preferred embodiments of the present invention will now be described. In the following description, components having substantially the same functions as those in the first preferred embodiment will be referred to by the same reference numerals and their description will be omitted.

Second and Third Preferred Embodiments

Figure 15:
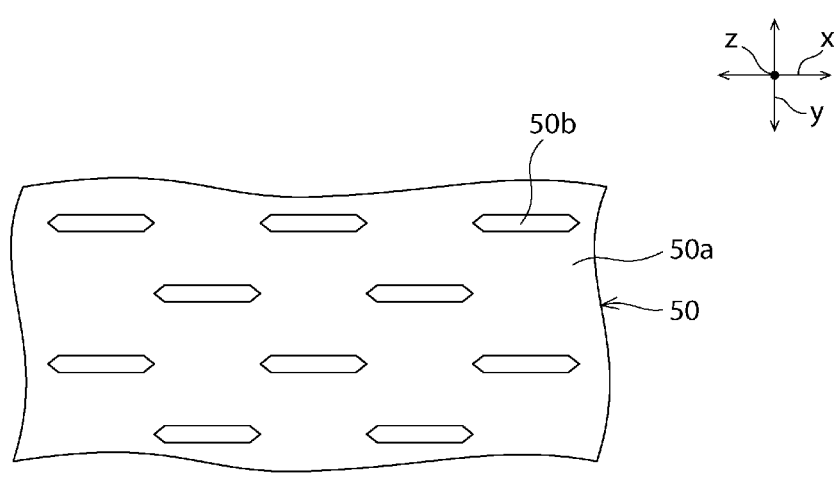
FIG. 15 is a schematic plan view of a ceramic green sheet according to a second preferred embodiment of the present invention.
Figure 16:
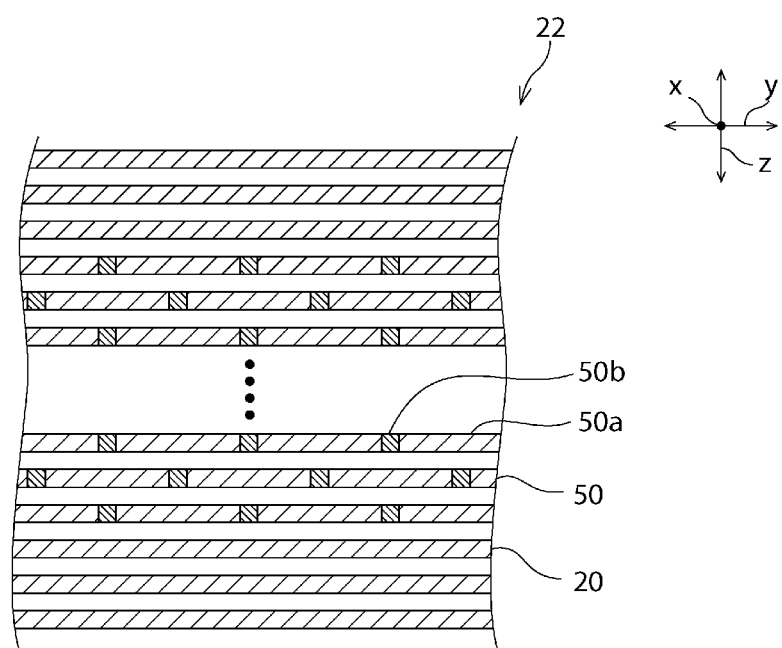
FIG. 16 is a schematic exploded side view of a ceramic green sheet laminate according to the second preferred embodiment of the present invention.
Figure 17:
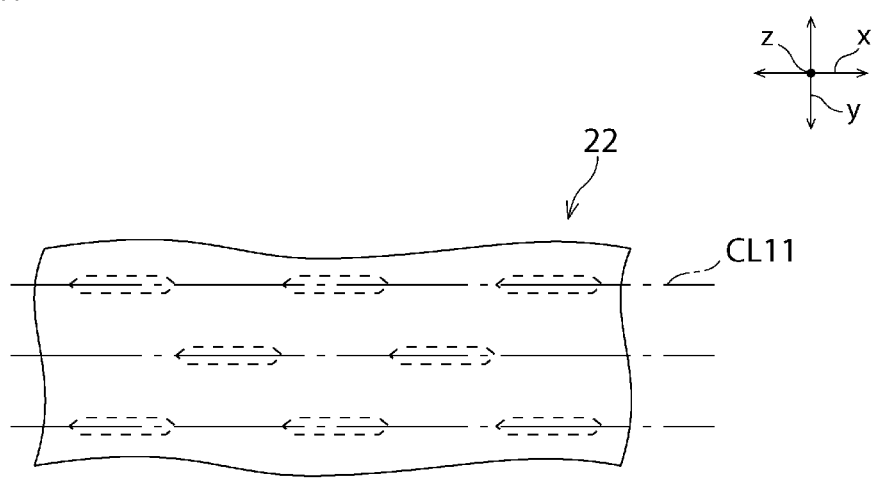
FIG. 17 is a schematic plan view for explaining cutting lines in a first cutting step of the second preferred embodiment of the present invention.
Figure 18:
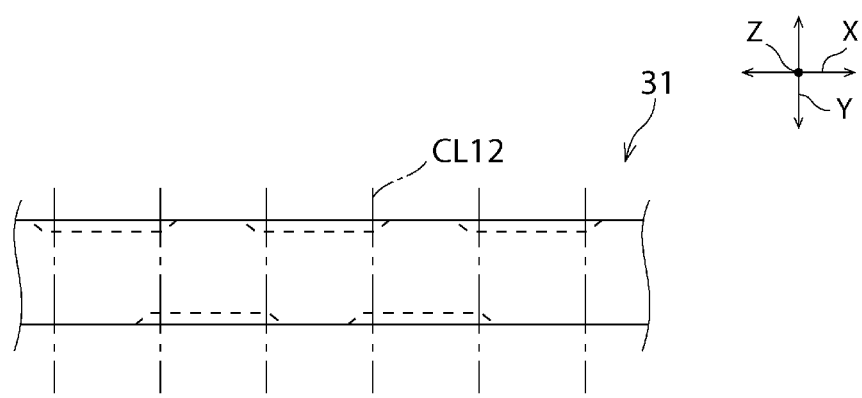
FIG. 18 is a schematic plan view for explaining cutting lines in a second cutting step of the second preferred embodiment of the present invention.
Figure 19:
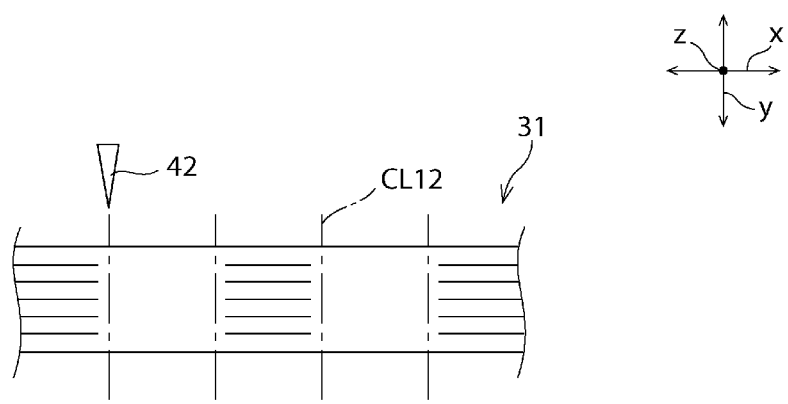
FIG. 19 is a schematic side view for explaining the cutting lines in the second cutting step of the second preferred embodiment of the present invention.
Figure 20:
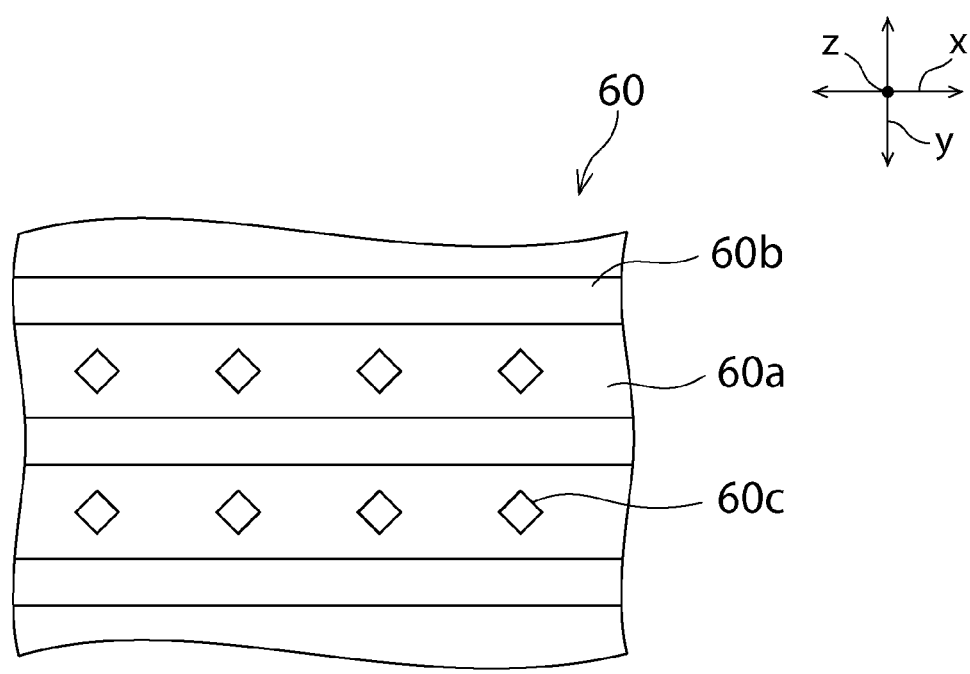
FIG. 20 is a schematic plan view of a ceramic green sheet according to a third preferred embodiment of the present invention.
Figure 21:
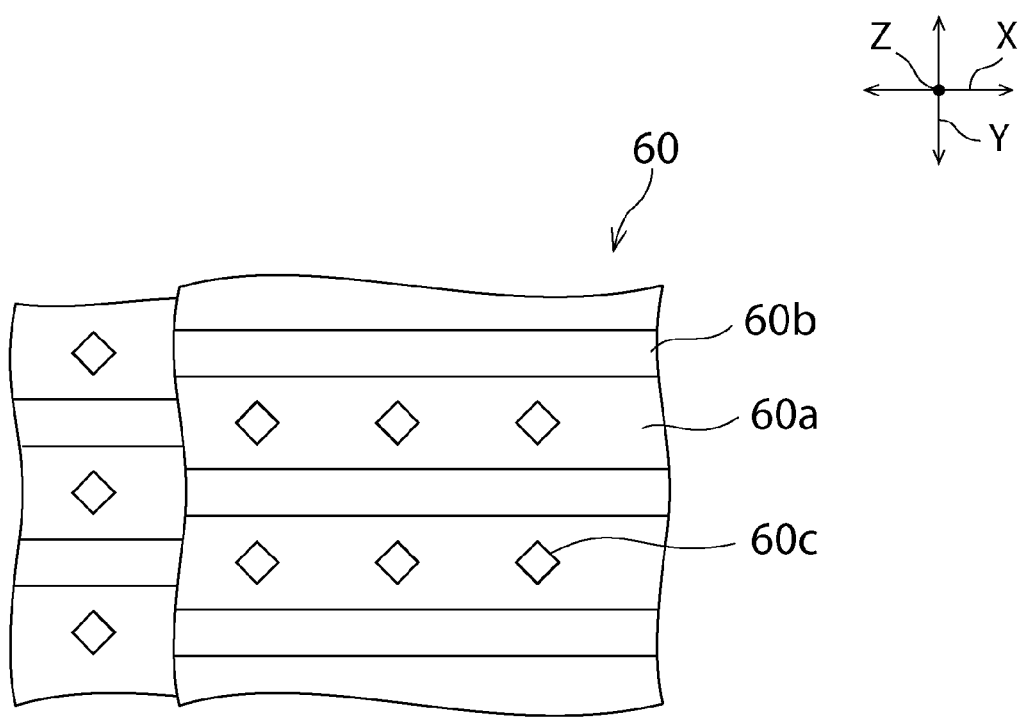
FIG. 21 is a schematic plan view for explaining a process of stacking ceramic green sheets according to the third preferred embodiment of the present invention.
Figure 22:
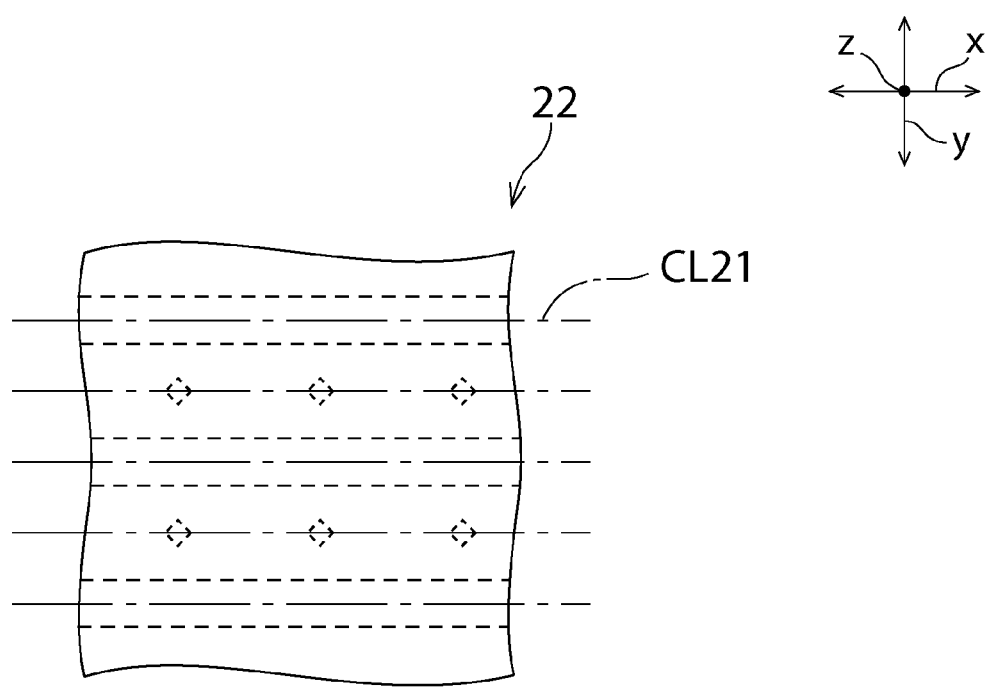
FIG. 22 is a schematic plan view for explaining cutting lines in a first cutting step of the third preferred embodiment of the present invention.
Figure 23:
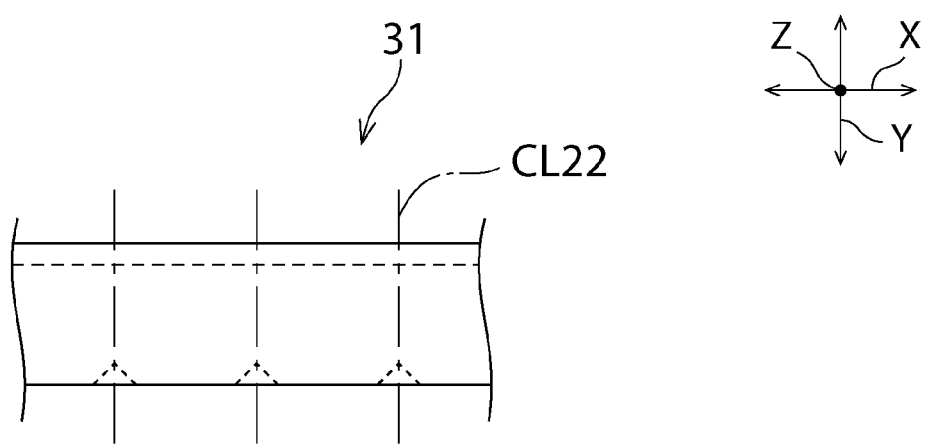
FIG. 23 is a schematic plan view for explaining cutting lines in a second cutting step of the third preferred embodiment of the present invention.

FIG. 15 is a schematic plan view of a ceramic green sheet according to a second preferred embodiment of the present invention. FIG. 16 is a schematic exploded side view of a ceramic green sheet laminate according to the second preferred embodiment. FIG. 17 is a schematic plan view for explaining cutting lines in a first cutting step of the second preferred embodiment. FIG. 18 is a schematic plan view for explaining cutting lines in a second cutting step of the second preferred embodiment. FIG. 19 is a schematic side view for explaining the cutting lines in the second cutting step of the second preferred embodiment. FIG. 20 is a schematic plan view of a ceramic green sheet according to a third preferred embodiment of the present invention. FIG. 21 is a schematic plan view for explaining a process of stacking ceramic green sheets according to the third preferred embodiment. FIG. 22 is a schematic plan view for explaining cutting lines in a first cutting step of the third preferred embodiment. FIG. 23 is a schematic plan view for explaining cutting lines in a second cutting step of the third preferred embodiment.

In the first preferred embodiment described above, the ceramic green sheet laminate 22 is produced using the ceramic green sheets 20 on which the conductive films 21 are formed in stripes. However, the present invention is not limited to this. For example, the ceramic green sheet laminate 22 may be produced in the following manner.

In the second preferred embodiment, in addition to the ceramic green sheet 20 (see FIG. 6) formed only by a ceramic region, a ceramic green sheet 50 illustrated in FIG. 15 is prepared. The ceramic green sheet 50 includes a conductive region 50a and a plurality of linear ceramic portions 50b exposed at a surface of the ceramic green sheet 50 via a plurality of through holes in the conductive region 50a. As illustrated in FIG. 16, after a plurality of ceramic green sheets 20 are stacked in layers, a plurality of ceramic green sheets 50 are stacked on top of the ceramic green sheets 20 such that the linear ceramic portions 50b are alternately displaced in the y direction. Additionally, a plurality of ceramic green sheets 20 are stacked on top of the ceramic green sheets 50 to form the ceramic green sheet laminate 22. Then, in the first cutting step, as illustrated in FIG. 17, the ceramic green sheet laminate 22 is pressed and cut to form the strips 31 by moving a cutting blade (not shown) in the z direction, the cutting blade being positioned along a cutting line CL11 extending in the x direction parallel or substantially parallel to the direction in which the linear ceramic portions 50b extend. In the second cutting step, as illustrated in FIG. 18 and FIG. 19, the strips 31 are pressed and cut by moving the cutting blade 42 in the y direction perpendicular or substantially perpendicular to the z direction (stacking direction), the cutting blade 42 being positioned along a cutting line CL12 extending in the z direction. Thus, as in the first preferred embodiment, the high-performance monolithic ceramic electronic components 1 including the thin ceramic layers 10g can be desirably manufactured at a high yield rate.

In the third preferred embodiment, in addition to the ceramic green sheet 20 (see FIG. 6) formed only by a ceramic region, a ceramic green sheet 60 illustrated in FIG. 20 is prepared. The ceramic green sheet 60 includes a conductive region 60a, a plurality of linear ceramic portions 60b exposed at a surface of the ceramic green sheet 60 via a plurality of through holes in the conductive region 60a, and a plurality of dot-shaped ceramic portions 60c. The linear ceramic portions 60b are spaced from each other in the y direction. The dot-shaped ceramic portions 60c are spaced from each other in the x direction, and each row of dot-shaped ceramic portions 60c is located between two linear ceramic portions 60b adjacent in the y direction. After a plurality of ceramic green sheets 20 are stacked in layers, a plurality of ceramic green sheets 60 are stacked, as illustrated in FIG. 21, on top of the ceramic green sheets 20 such that the linear ceramic portions 60b coincide with the respective rows of dot-shaped ceramic portions 60c in the z direction. Additionally, a plurality of ceramic green sheets 20 are stacked on top of the ceramic green sheets 60 to form the ceramic green sheet laminate 22. Then, in the first cutting step, as illustrated in FIG. 22, the ceramic green sheet laminate 22 is pressed and cut to form the strips 31 by moving a cutting blade (not shown) in the z direction, the cutting blade being positioned along a cutting line CL21 extending in the x direction parallel or substantially parallel to the direction in which the linear ceramic portions 60b extend. In the second cutting step, as illustrated in FIG. 23, the strips 31 are pressed and cut by moving the cutting blade 42 (not shown) in the y direction perpendicular or substantially perpendicular to the z direction (stacking direction), the cutting blade 42 being positioned along a cutting line CL22 extending in the z direction. Thus, as in the first preferred embodiment, the high-performance monolithic ceramic electronic components 1 having the thin ceramic layers 10g can be manufactured at a high yield rate.

EXAMPLES

By using the manufacturing method of the first preferred embodiment, about 3000 monolithic ceramic electronic components identical to the monolithic ceramic electronic components 1 of the first preferred embodiment were produced as samples under the following conditions.

Length of ceramic base 10: about 1.2 mm
Width of ceramic base 10: about 0.6 mm
Thickness of ceramic base 10: about 0.6 mm
Thickness of internal electrode: about 0.4 μm
Number of stacked ceramic green sheets: about 500
Thickness of ceramic green sheet: about 1.5 μm, about 1.2 μm, about 1.0 μm, or about 0.7 μm Of the about 3000 samples produced, about 200 samples were taken to check for a short circuit between the first and second internal electrodes 11 and 12. Then, the defect rate representing the number of short circuits as a percentage was calculated and shown in Table 1.

Comparative Example

About 3000 monolithic ceramic electronic components were produced as samples in the same manner as that in the above-described Examples, except that the pressing and cutting operation in the second cutting step was performed by moving a cutting blade in the z direction (stacking direction). Of the about 3000 samples produced, about 200 samples were taken to check for a short circuit between the first and second internal electrodes 11 and 12. Then, the defect rate representing the number of short circuits as a percentage was calculated and shown in Table 1.

TABLE 1

| Thickness of Ceramic Green Sheet | Defect Rate (%) | |
| --- | --- | --- |
| | Example | Comparative Example |
| 1.5 μm | 3% | 95% |
| 1.2 μm | 6% | 100% |
| 1.0 μm | 13% | 100% |
| 0.7 μm | 18% | 100% |

Table 1 shows that by moving a cutting blade in a direction perpendicular or substantially perpendicular to the stacking direction to perform the pressing and cutting operation in the second cutting step, it is possible to effectively reduce the occurrence of short circuits between internal electrodes.

Table 1 also shows that a short circuit between internal electrodes tends to occur when ceramic green sheets are about 1.5 μm or more in thickness.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method for manufacturing monolithic ceramic electronic components comprising:
    a step of making ceramic laminates, each including a ceramic laminate main body including first and second principal surfaces extending in a length direction and a width direction, first and second side surfaces extending in the length direction and a thickness direction, and first and second end surfaces extending in the width direction and the thickness direction; first internal electrodes disposed inside the ceramic laminate main body to be parallel or substantially parallel with the first and second principal surfaces, the first internal electrodes being exposed at the first end surface and the first and second side surfaces; and second internal electrodes disposed inside the ceramic laminate main body to face the respective first internal electrodes in the thickness direction, with ceramic layers interposed between adjacent ones of the first and second internal electrodes, the second internal electrodes being exposed at the second end surface and the first and second side surfaces; wherein
    the step of making ceramic laminates includes:
        a step of producing a ceramic green sheet laminate by stacking ceramic green sheets in a stacking direction, each including conductive films for forming the first or second internal electrodes on a surface thereof;
        a first cutting step of cutting the ceramic green sheet laminate by pressing and moving a first cutting blade only in the stacking direction to form the first and second end surfaces at which the first or second internal electrodes are exposed; and
        a second cutting step of cutting the ceramic green sheet laminate by pressing and moving a second cutting blade only in a direction perpendicular to the stacking direction to form the first and second side surfaces at which the first and second internal electrodes are exposed; wherein
    in the second cutting step, the ceramic green sheet laminate is pressed and cut by moving the second cutting blade in the length direction or the width direction with a cutting edge of the second cutting blade extending in the stacking direction.

2. The method for manufacturing monolithic ceramic electronic components according to claim 1, wherein the ceramic green sheets are each about 1.5 μm or less in thickness.

3. The method for manufacturing monolithic ceramic electronic components according to claim 1, wherein the second cutting step is performed after the ceramic green sheet laminate is cut into strips and caused to adhere to a base in the first cutting step.

4. The method for manufacturing monolithic ceramic electronic components according to claim 1, wherein the step of making ceramic laminates further includes, before the first and second cutting steps, a step of cutting off an outer edge of the ceramic green sheet laminate to allow the conductive films to be exposed.

5. The method for manufacturing monolithic ceramic electronic components according to claim 1, wherein the ceramic laminate main body has a rectangular or substantially rectangular parallelepiped shape.

6. The method for manufacturing monolithic ceramic electronic components according to claim 1, wherein the monolithic ceramic electronic components are capacitors.

7. The method for manufacturing monolithic ceramic electronic components according to claim 1, wherein the monolithic ceramic electronic components are piezoelectric components.

8. The method for manufacturing monolithic ceramic electronic components according to claim 1, wherein the monolithic ceramic electronic components are thermistors.

9. The method for manufacturing monolithic ceramic electronic components according to claim 1, wherein the monolithic ceramic electronic components are inductors.

10. The method for manufacturing monolithic ceramic electronic components according to claim 1, further comprising forming protective portions on both sides of the ceramic laminate main body in width directions thereof.

11. The method for manufacturing monolithic ceramic electronic components according to claim 10, wherein the protective portions are areas where the first and second internal electrodes are not present.

12. The method for manufacturing monolithic ceramic electronic components according to claim 10, wherein the protective portions are about 0.2 mm to about 0.5 mm in the width direction.

13. The method for manufacturing monolithic ceramic electronic components according to claim 1, wherein the first and second internal electrodes are made of nickel, copper, silver, palladium, gold, or an alloy containing at least one of nickel, copper, silver, palladium, and gold.

14. The method for manufacturing monolithic ceramic electronic components according to claim 1, further comprising forming external electrodes on the ceramic laminate main body.

15. The method for manufacturing monolithic ceramic electronic components according to claim 14, wherein the external electrodes each include a foundation layer and a plating layer formed on the foundation layer.

16. The method for manufacturing monolithic ceramic electronic components according to claim 15, wherein the foundation layer includes a sintered metal layer, a plating layer or a conductive resin layer.

17. The method for manufacturing monolithic ceramic electronic components according to claim 1, wherein the ceramic green sheets each include only ceramic portions.

18. The method for manufacturing monolithic ceramic electronic components according to claim 1, wherein the ceramic green sheets each include ceramic portions and conductive portions.

19. The method for manufacturing monolithic ceramic electronic components according to claim 1, wherein the ceramic green sheets each include ceramic portions, conductive portions and a plurality of dot-shaped ceramic portions.

* * * * *